United States Patent
Kim et al.

(10) Patent No.: US 10,401,552 B2
(45) Date of Patent: Sep. 3, 2019

(54) DISPLAY APPARATUS

(71) Applicant: Samsung Display Co., Ltd., Yongin-Si, Gyeonggi-Do (KR)

(72) Inventors: Kyung-min Kim, Hwaseong-si (KR); Hyuk-hwan Kim, Hwaseong-si (KR); Youngchun Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/635,713

(22) Filed: Jun. 28, 2017

(65) Prior Publication Data

US 2018/0106940 A1    Apr. 19, 2018

(30) Foreign Application Priority Data

Oct. 18, 2016  (KR) .................. 10-2016-0135326

(51) Int. Cl.
*F21V 8/00* (2006.01)
*G02F 1/1335* (2006.01)

(52) U.S. Cl.
CPC .......... *G02B 6/005* (2013.01); *G02B 6/0053* (2013.01); *G02F 1/133512* (2013.01); *G02F 1/133514* (2013.01); *G02F 1/133528* (2013.01); *G02F 1/133615* (2013.01); *G02F 1/133621* (2013.01); *G02F 2001/133521* (2013.01); *G02F 2001/133614* (2013.01); *G02F 2202/36* (2013.01); *G02F 2203/05* (2013.01)

(58) Field of Classification Search
CPC .............. G02B 6/005; G02F 1/133621; G02F 2001/133614; G02F 1/133615
See application file for complete search history.

(56) References Cited

U.S. PATENT DOCUMENTS

| | | | |
|---|---|---|---|
| 5,583,676 A | * 12/1996 | Akiyama | ............. G02F 1/1354 349/110 |
| 2002/0153845 A1 | 10/2002 | Lee et al. | |
| 2004/0017529 A1 | 1/2004 | Choi et al. | |
| 2009/0267092 A1 | * 10/2009 | Fukshima | ............. H01L 33/20 257/98 |

(Continued)

FOREIGN PATENT DOCUMENTS

| | | |
|---|---|---|
| JP | 4454497 B2 | 4/2010 |
| JP | 5357009 B2 | 12/2013 |

(Continued)

*Primary Examiner* — Jia X Pan
(74) *Attorney, Agent, or Firm* — Cantor Colburn LLP

(57) ABSTRACT

A display apparatus includes a light source which generates a first light, a display module which displays an image, a light guide plate disposed under the display module, and an optical filter disposed under the light guide plate to face the display module. The optical filter includes a filter layer which transmits a portion of the first light from the light guide plate and reflects a remaining portion of the first light except for the portion and an absorbing layer disposed under the filter layer to absorb the first light transmitted thereto through the filter layer. As an incident angle of the first light incident to the filter layer with respect to a normal line of an upper surface of the filter layer increases, an overlapping bandwidth between a reflection wavelength bandwidth of the filter layer and a wavelength bandwidth of the first light increases.

17 Claims, 7 Drawing Sheets

(56) References Cited

U.S. PATENT DOCUMENTS

| | | | | |
|---|---|---|---|---|
| 2010/0026703 | A1* | 2/2010 | Parker | G02B 6/0046 345/589 |
| 2010/0208169 | A1* | 8/2010 | Mun | G02F 1/133555 349/65 |
| 2011/0102876 | A1 | 5/2011 | Cho et al. | |
| 2012/0069271 | A1* | 3/2012 | Kanade | G02F 1/133514 349/62 |
| 2013/0242228 | A1* | 9/2013 | Park | G02F 1/133617 349/61 |
| 2014/0132890 | A1* | 5/2014 | Zhang | G02F 1/133514 349/69 |
| 2014/0209949 | A1* | 7/2014 | Chuang | H01L 33/46 257/98 |

FOREIGN PATENT DOCUMENTS

| | | |
|---|---|---|
| JP | 2016026323 A | 2/2016 |
| KR | 100526903 B1 | 2/2006 |
| KR | 100573634 B1 | 4/2006 |
| KR | 1020150137722 A | 12/2015 |
| KR | 1020180034741 A | 4/2018 |
| WO | 9701788 A1 | 1/1997 |
| WO | 2007122009 A1 | 11/2007 |
| WO | 2015178590 A1 | 11/2015 |

* cited by examiner

DISPLAY APPARATUS

This application claims priority to Korean Patent Application No. 10-2016-0135326, filed on Oct. 18, 2016, and all the benefits accruing therefrom under 35 U.S.C. § 119, the content of which in its entirety is herein incorporated by reference.

BACKGROUND

1. Field

The disclosure relates to a display apparatus. More particularly, the disclosure relates to a display apparatus with improved contrast ratio in a dark state.

2. Description of the Related Art

An electronic device, such as a mobile communication terminal, a digital camera, a notebook, a monitor or a television set, for example, typically includes a display apparatus to display an image.

In general, the display apparatus includes a display panel for displaying the image and a backlight unit for providing the display panel with a light. The display panel may control a transmittance of the light provided from the backlight unit while traveling therethrough, and thus a desired image is displayed.

The backlight unit is typically classified into an edge-illumination type backlight unit, which is disposed adjacent to a side surface of the display panel to provide the light to the display panel through the side surface, and a direct-illumination type backlight unit, which is disposed under the display panel to provide the light to a lower surface of the display panel. The edge-illumination type backlight unit may include a light source for generating the light and a light guide plate for guiding the light. In the edge-illumination type backlight unit, the light source may be disposed at a side portion of the light guide plate, and the light guide plate guides the light generated by the light source to the display panel.

SUMMARY

The disclosure provides a display apparatus with improved contrast ratio in a dark state.

According to an embodiment of the invention, a display apparatus includes a light source which generates a first light, a display module which displays an image, a light guide plate disposed under the display module, and an optical filter disposed under the light guide plate. In such an embodiment, the optical filter includes: a filter layer which transmits a portion of the first light incident thereto from the light guide plate, and reflects a portion of a remaining portion of the first light incident thereto from the light guide plate except for the portion; and an absorbing layer disposed under the filter layer and which absorbs the transmitted portion of the first light through the filter layer. In such an embodiment, an angle between the first light incident to the filter layer from the light guide plate and a normal line of an upper surface of the filter layer is defined as an incident angle, and an overlapping bandwidth between a reflection wavelength bandwidth of the filter layer and a wavelength bandwidth of the first light increases as the incident angle increases.

In an embodiment, the display apparatus may further include a light condensing member disposed between the display module and the light guide plate, and the light condensing member may include a plurality of inverse prisms.

In an embodiment, the display module may include a first substrate, a plurality of pixels arranged on the first substrate, a second substrate disposed opposite to the first substrate, a light conversion layer arranged on the second substrate, and a liquid crystal layer disposed between the first substrate and the second substrate, and the light conversion layer may convert the first light to a second light or a third light, where each of the second light and the third light may a wavelength bandwidth different from the wavelength bandwidth of the first light.

In an embodiment, the light conversion layer may include a first conversion filter which converts the first light to the second light, a second conversion filter which converts the first light to the third light, and a light blocking layer disposed between the first conversion filter and the second conversion filter when viewed in a plan view.

In an embodiment, the first conversion filter may include a plurality of first quantum dots, the second conversion filter may include a plurality of second quantum dots, where each of the first quantum dots may have a size different from a size of each of the second quantum dots.

In an embodiment, the display module may further include a first polarizing layer disposed under the second substrate and a second polarizing layer disposed between the liquid crystal layer and the light conversion layer.

In an embodiment, the overlapping bandwidth between the reflection wavelength bandwidth of the filter layer and the wavelength bandwidth of the first light may have a minimum value when the incident angle is zero (0) degree.

In an embodiment, the reflection wavelength bandwidth of the filter layer may include the wavelength bandwidth of the second light when the incident angle is about zero (0) degree.

In an embodiment, the filter layer may include a plurality of first insulating layers, each having a first refractive index and a plurality of second insulating layers, each having a second refractive index different from the first refractive index, and the first insulating layers are alternately stacked with the second insulating layers.

In an embodiment, the first light may be a blue light.

In an embodiment, the absorbing layer may have a black color.

In an embodiment, a color of the absorbing layer may be a complementary color to a color of the first light.

According to an embodiment of the invention, a display apparatus includes a light source which generates a first light, a display module which displays an image, a light guide plate disposed under the display module and which receives the first light from the light source, and an optical filter disposed to face the display module such that the light guide plate is disposed between the optical filter and the display module. In such an embodiment, the optical filter includes a filter layer disposed under the light guide plate and which selectively transmits or reflects the first light from the light guide plate and an absorbing layer disposed under the filter layer and which absorbs a transmitted first light, which is transmitted through the filter layer and incident thereto. In such an embodiment, an angle between the transmitted first light and a normal line of an upper surface of the filter layer is defined as an incident angle, a reflectance of the filter layer with respect to the transmitted first light increases as the incident angle increases.

In an embodiment, the display apparatus may further include a light condensing member disposed between the display module and the light guide plate, where the light condensing member may include a plurality of inverse prisms.

In an embodiment, the display module may include a first polarizing layer disposed at a lowermost position of the display module and having an absorbing axis, a second polarizing layer disposed on the first polarizing layer and having a transmitting axis, a liquid crystal layer disposed between the first polarizing layer and the second polarizing layer, and a light conversion layer disposed on the second polarizing layer, where the light conversion layer may include a plurality of quantum dots.

In an embodiment, a reflection wavelength bandwidth of the filter layer may not overlap a wavelength bandwidth of the first light when the incident angle is zero (0) degrees.

In an embodiment, the filter layer may have a multi-layer structure in which a plurality of insulating layers having different refractive indices are alternately stacked one on another.

According to an embodiment of the invention, a display apparatus includes a display module including a light conversion layer disposed therein, where the light conversion layer includes a plurality of quantum dots, and a backlight unit disposed under the display module, where the backlight unit provides a light to the display module. In such an embodiment, the backlight unit includes a light source which generates the light, a light guide plate which guides the light from the light source to the display module, a light condensing member disposed between the light guide plate and the display module, where the light condensing member includes a plurality of inverse prisms, and an optical filter disposed under the light guide plate. In such an embodiment, the optical filter includes a filter layer disposed under the light condensing member and which selectively transmits or reflects the light incident thereto from the light guide plate and an absorbing layer disposed under the filter layer and which absorbs the light transmitted thereto through the filter layer. In such an embodiment, an angle between the light incident to the filter layer from the light guide plate and a normal line of an upper surface of the filter layer is defined as an incident angle, and a reflection wavelength of the filter layer decreases as the incident angle increases.

In an embodiment, the absorbing layer may include: a polymer layer; and a plurality of light absorbing particles arranged dispersed in the polymer layer, where the light absorbing particles may absorb the light transmitted thereto through the filter layer.

In an embodiment, the polymer layer may include an adhesive material

According to embodiments described herein, the contrast ratio of the display apparatus may be improved when the display apparatus is in the dark state.

BRIEF DESCRIPTION OF THE DRAWINGS

The above and other features of embodiments of the disclosure will become readily apparent by reference to the following detailed description when considered in conjunction with the accompanying drawings, in which.

DETAILED DESCRIPTION

Figure 1:
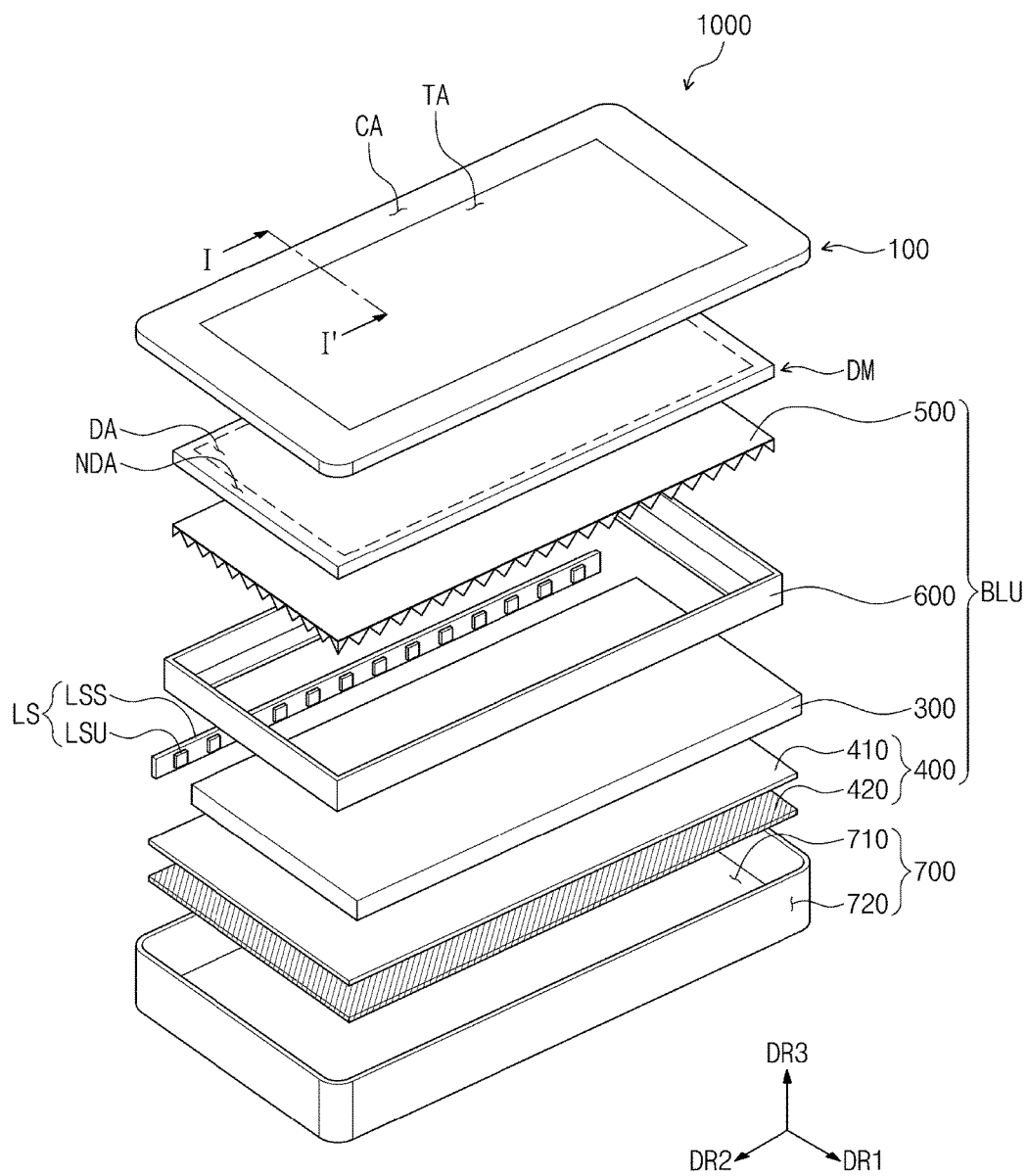
FIG. 1 is an exploded perspective view showing a display apparatus according to an exemplary embodiment of the disclosure.

Hereinafter, exemplary embodiments of the invention will be explained in detail with reference to the accompanying drawings. The disclosure and methods of accomplishing the same may be understood more readily by reference to the following detailed description of embodiments and the accompanying drawings. However, the disclosure may be embodied in many different forms, and should not be construed as being limited to the embodiments set forth herein. Rather, these embodiments are provided so that this disclosure will be thorough and complete and will fully convey the concept of the invention to those skilled in the art, and the disclosure will only be defined by the appended claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Embodiments described in the disclosure are described with reference to plan views and cross-sectional views that are ideal schematic diagrams. Accordingly, shapes of the exemplary views may vary depending on manufacturing technologies and/or tolerances. Thus, embodiments are not limited to shown specific forms and also include variations in form produced according to manufacturing processes. Therefore, regions illustrated in the drawings are exemplary, and the shapes of the regions illustrated in the drawings are intended to illustrate the specific shapes of the regions of elements and not to limit the scope of the disclosure.

Hereinafter, exemplary embodiments of the invention will be described in detail with reference to the accompanying drawings.

Figure 2:
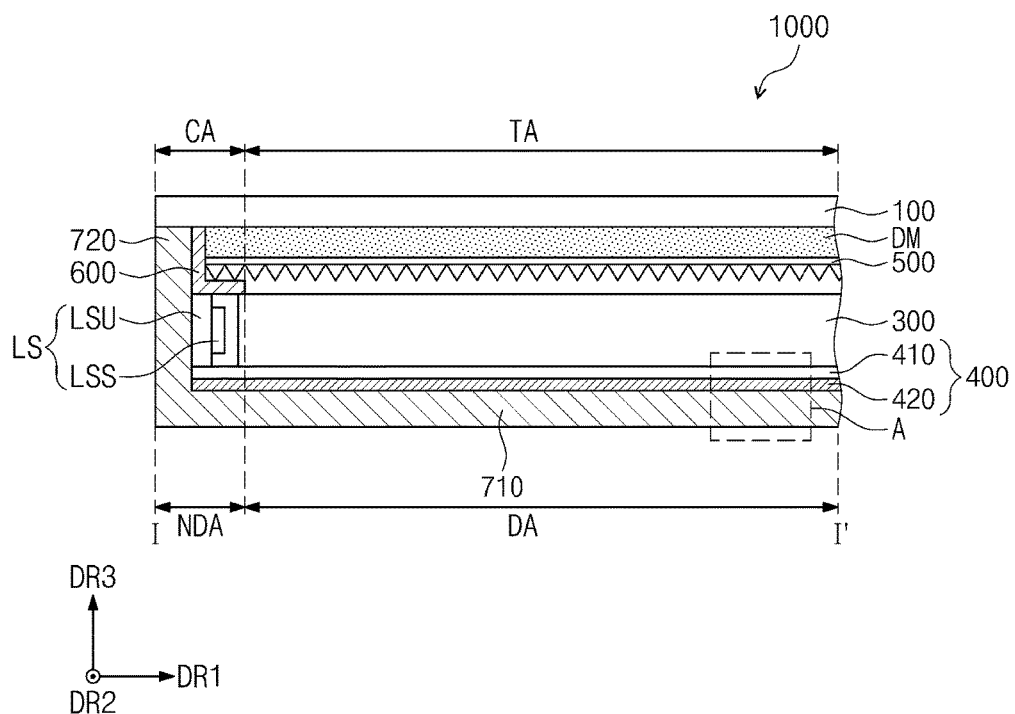
FIG. 2 is a cross-sectional view taken along line I-I' shown in FIG. 2.

FIG. 1 is an exploded perspective view showing a display apparatus 1000 according to an exemplary embodiment of the disclosure, and FIG. 2 is a cross-sectional view taken along line I-I' shown in FIG. 2.

Referring to FIGS. 1 and 2, an exemplary embodiment of the display apparatus 1000 has a substantially rectangular shape with two short sides in a first direction DR1 and two long sides in a second direction DR2, but the shape of the display apparatus 1000 should not be limited to the rectangular shape.

In an exemplary embodiment, the display apparatus 1000 includes a window member 100, a display module DM, a backlight unit BLU, and an accommodating member 700.

For the convenience of description, a direction to which an image is displayed from the display apparatus 1000 is referred to as an upper direction and a direction opposite to the upper direction is referred to as a lower direction, but they should not be limited thereto or thereby. In an exemplary embodiment, the upper and lower directions are substantially parallel to a third direction DR3 perpendicular to a first direction DR1 and a second direction DR2. Herein the third direction DR3 may be a thickness direction of the display apparatus 1000. The third direction DR3 may be a reference direction to distinguish a front surface from a rear surface of the components of the display apparatus 1000. However, the upper direction and the lower direction are relative to each other, and thus the upper direction and the lower direction may be changed to other directions.

The window member 100 includes a light transmission area TA for transmitting light or an image output from the display module DM and a light block area CA disposed adjacent to the light transmission area TA and which blocks light. The light transmission area TA is disposed at a center of the display apparatus 1000 in a plane surface defined by the first direction DR1 and the second direction DR2. The light block area CA is disposed in the vicinity of the light transmission area TA and has a frame shape surrounding the light transmission area TA.

According to an alternative exemplary embodiment of the disclosure, the window member 100 may include only the light transmission area TA. In such an embodiment, the light block area CA may be omitted. In such an embodiment, the image may be displayed through the entire area of an upper surface of the window member 100.

The window member 100 may include a glass, sapphire, or plastic material.

The display module DM is disposed under the window member 100. The display module DM displays the image using the light provided from the backlight unit BLU.

In the plane surface, a display area DA through which the image is displayed and a non-display area DA through which the image is not displayed are defined in the display module DM. The display area DA is defined at a center of the display module DM and overlaps the light transmission area TA of the window member 100 when viewed in a plan view or a top plan view. The non-display area NDA is defined to surround the display area DA and overlaps the light block area CA of the window member 100. The display module DM will be described later in greater detail with reference to FIG. 3.

The backlight unit BLU is disposed under the display module DM to provide the light to the display module DM. In an exemplary embodiment, the backlight unit BLU may be, but not limited to, an edge-illumination type backlight unit.

The backlight unit BLU includes a light source LS, a light guide plate 300, an optical filter 400, a light condensing member 500, and a mold frame 600.

The light source LS is disposed adjacent to a side surface of the light guide plate 300 in the first direction DR1, but it should not be limited thereto or thereby. In an exemplary embodiment, the light source LS may be disposed adjacent to at least one of side surfaces of side surfaces of the light guide plate 300.

The light source LS includes a plurality of light source units LSU and a light source substrate LSS. The light source units LSU generate the light, which is to be provided to the display module DM, and provide the light to the light guide plate 300.

According to an exemplary embodiment, the light source units LSU may generate a first light. In one exemplary embodiment, for example, the first light may include a wavelength bandwidth equal to or greater than about 400 nanometers (nm) and equal to or smaller than about 500 nm. In such an embodiment, the light source units LSU may generate a blue light.

According to an exemplary embodiment, the light source units LSU may include a light emitting diode ("LED") as a point light source, but they should not be limited thereto or thereby.

According to an alternative exemplary embodiment, one LED or a plurality of LED groups may be employed as the light source units LSU. In another alternative exemplary embodiment, the light source units LSU may be a linear light source.

The light source units LSU may be disposed or mounted on the light source substrate LSS. The light source substrate LSS is disposed to face the side surface of the light guide plate 300 in the first direction DR1 and extends in the second direction DR2. A wiring line may be provided, e.g., printed, on the light source substrate LSS to provide and control a power to the light source units LSU. In an exemplary embodiment, the light source substrate LSS may include a light source controller (not shown) connected to the light source units LSU. In such an embodiment, the light source controller (not shown) analyzes the image displayed through the display module DM to output a local dimming signal and controls a brightness of the light generated by the light source units LSU in response to the local dimming signal. According to an alternative exemplary embodiment of the disclosure, the light source controller (not shown) may be disposed or mounted on a separate circuit board, but a position of the light source controller should not be limited to a specific position.

The light guide plate 300 is disposed under a first polarizing layer POL1. The light guide plate 300 may have a plate-like shape. The light guide plate 300 changes a path of the light provided from the light source LS to the upper direction in which the display module DM is disposed. Although not shown in figures, the light guide plate 300 may include a diffusion pattern (not shown) defined or arranged on an upper surface thereof.

The light guide plate 300 includes a material having high light transmittance in a visible light area. In one exemplary embodiment, for example, the light guide plate 300 may include a transparent polymer resin, e.g., polycarbonate ("PC"), polymethylmethacrylate ("PMMA"), etc. In an alternative exemplary embodiment, the light guide plate 300 may include a glass material.

The optical filter 400 is disposed under the light guide plate 300. The optical filter 400 selectively transmits or absorbs the light incident thereto from the light guide plate 300.

In an exemplary embodiment, the optical filter 400 includes a filter layer 410 and an absorbing layer 420. The filter layer 410 selectively transmits or reflects the light incident thereto from the light guide plate 300.

The absorbing layer 420 is disposed under the filter layer 410. In an exemplary embodiment, the absorbing layer 420 disposed under the filter layer 410 may have a sheet shape or a film shape.

The absorbing layer 420 absorbs the light incident thereto from the filter layer 410. The absorbing layer 420 may have a variety of colors according to the wavelength bandwidth of the light that is to be absorbed by the absorbing layer 420. In one exemplary embodiment, for example, the absorbing layer 420 may have a black color. In an alternative exemplary embodiment, the light to be absorbed by the absorbing layer 420 is the blue light, and the absorbing layer 420 may have a yellow color.

In an exemplary embodiment, the absorbing layer 420 has the sheet shape, but the shape of the absorbing layer 420 should not be limited to the sheet shape. According to an alternative exemplary embodiment, the absorbing layer 420 may be provided by printing an ink material on a lower portion of the filter layer 410. In such an embodiment, the filter layer 410 is provided or formed by a thin film coating process or a sputtering process.

In another alternative exemplary embodiment, the absorbing layer 420 may be provided in an integral form with the accommodating member 700. In one exemplary embodiment, for example, the absorbing layer 420 may be a layer printed on a bottom portion 710 of the accommodating member 700. In exemplary embodiments, various absorbing layers may be applied to the display apparatus 1000. The optical filter 400 will be described later in greater detail with reference to FIGS. 4 to 9.

The light condensing member 500 is disposed between the light guide plate 300 and the display module DM. The light condensing member 500 condenses the light provided from the light guide plate 300 in the upper direction.

According to an exemplary embodiment, the light condensing member 500 includes a plurality of inverse prisms. Each of the inverse prisms changes a direction of the light provided to the light guide plate 300. In one exemplary embodiment, for example, when the light provided from the light guide plate 300 is inclined while being incident to the light condensing member 500, the light is reflected by the inverse prisms of the light condensing member 500 and travels in a direction vertical to the plane surface. In such an embodiment, when the light provided from the light guide plate 300 is incident to the light condensing member 500 along a direction closer to the direction vertical to the plane surface, the light is reflected by the inverse prisms of the light condensing member 500 and travels in the direction closer to a direction parallel to the plane surface.

In an exemplary embodiment, as described above, the light condensing member 500 includes the inverse prisms, but the light condensing member 500 should not be limited to the inverse prisms. In an alternative exemplary embodiment, the light condensing member 500 may have another configuration different from the above-mentioned structure of the inverse prisms as long as the light condensing member 500 performs a same function.

Although not shown in figures, the backlight unit BLU may further include an optical sheet (not shown). The optical sheet (not shown) is disposed on or under the light condensing member 500. The optical sheet (not shown) may be a diffusion sheet or a protective sheet.

The mold frame 600 is disposed above the light guide plate 300. In an exemplary embodiment, the mold frame 600 has a frame shape. In such an embodiment, the mold frame 600 is disposed to correspond to an edge area of the upper surface of the light guide plate 300. The mold frame 600 holds the display module DM and the backlight unit BLU.

The accommodating member 700 is disposed at a lowermost position of the display apparatus 1000 to accommodate the backlight unit BLU. The accommodating member 700 includes a bottom portion 710 and a plurality of sidewalls 720 connected to the bottom portion 710. In an exemplary embodiment, the light source LS may be disposed on an inner side surface of one of the sidewalls 720 of the accommodating member 700. The accommodating member 700 may include a metal material having rigidity.

Figure 3:
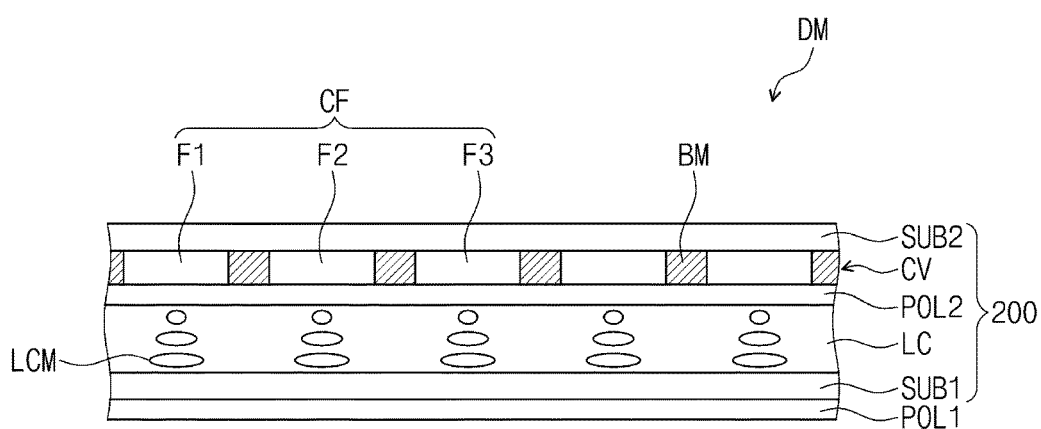
FIG. 3 is an enlarged cross-sectional view of a portion of a display module shown in FIG. 2.

FIG. 3 is an enlarged cross-sectional view of a portion the display module DM shown in FIG. 2.

Referring to FIG. 3, the display module DM includes a display member 200 and a first polarizing layer POL1.

The first polarizing layer POL1 is disposed between the display member 200 and the backlight unit BLU to polarize the light provided from the backlight unit BLU. The first polarizing layer POL1 may have a transmission axis (not shown) in a predetermined direction.

The display member 200 is disposed on the first polarizing layer POL1 to display the image through the display area DA. The display member 200 may be, but not limited to, a light-receiving type display panel. In one exemplary embodiment, for example, the display member 200 is a liquid crystal display panel.

The display member 200 includes a first substrate SUB1, a second substrate SUB2, a liquid crystal layer LC, a light conversion layer CV, and a second polarizing layer POL2.

The first substrate SUB1 is disposed on the first polarizing layer POL1. The first substrate SUB1 may include a material having high light transmittance to easily transmit the light from the backlight unit BLU. In one exemplary embodiment, for example, the first substrate SUB1 may be a transparent glass substrate, a transparent plastic substrate, or a transparent film.

Although not shown in figures, the first substrate SUB1 includes a pixel area (not shown) and a peripheral area (not shown) disposed adjacent to the pixel area, which are defined therein when viewed in a plan view. In an exemplary embodiment, the pixel area (not shown) is provided in a plural number, and the peripheral area (not shown) is defined between adjacent pixel areas.

The display member 200 further includes pixels (not shown) disposed in the pixel areas (not shown) of the first substrate SUB1, respectively. The pixels (not shown) include a plurality of pixel electrodes (not shown) and a plurality of thin film transistors (not shown) electrically connected to the pixel electrodes in a one-to-one correspondence. The thin film transistors are connected to the pixel electrodes, respectively, to switch a driving signal applied to each pixel electrode.

The second substrate SUB2 is disposed above the first substrate SUB1 to face the first substrate SUB1. The liquid crystal layer LC is interposed between the second substrate SUB2 and the first substrate SUB1. The liquid crystal layer LC includes a plurality of liquid crystal molecules LCM aligned in a predetermined direction.

The display member 200 further includes a common electrode (not shown) that is disposed on the second substrate SUB2 and generates an electric field with the pixel electrodes to control the alignment of the liquid crystal molecules LCM. The display member 200 drives the liquid crystal layer LC to display the image to the third direction DR3 that is the upper direction.

Although not shown in figures, the display member 200 may include a driving chip for generating the driving signal, a tape carrier package on which the driving chip is mounted, and a printed circuit board electrically connected to the display member 200 through the tape carrier package.

The second polarizing layer POL2 is disposed between the liquid crystal layer LC and the second substrate SUB2. The second polarizing layer POL2 may have an absorption axis in a predetermined direction. When the display apparatus 1000 is in a bright state, the second polarizing layer POL2 transmits the light, and when the display apparatus 1000 is in a dark state, the second polarizing layer POL2 absorbs the light.

An angle between the transmission axis of the first polarizing layer POL1 and the absorption axis of the second polarizing layer POL2 may be determined depending on the alignment mode of the liquid crystal molecules LCM. In one exemplary embodiment, for example, the transmission axis of the first polarizing layer POL1 may be substantially perpendicular to the absorption axis of the second polarizing layer POL2 when viewed in a plan view.

The light conversion layer CV is disposed between the second substrate SUB2 and the common electrode (not shown). The light conversion member CV includes a plurality of color filters CF and a black matrix (also referred to as "light blocking layer") BM.

The color filters CF may change a color of the light passed therethrough or transmit the light without changing the color of the light in accordance with energy of the light incident thereto. The incident light has various colors by the light conversion member CV and is implemented as the image.

The color filters CF may include a plurality of light conversion particles. Each light conversion particle absorbs at least a portion of the light incident thereto to emit a light having a specific color or to transmit the light without changing the color of the light.

When the light incident to the color filters CF has the energy enough to excite the light conversion particles, the light conversion particles are excited by absorbing at least the portion of the light incident to the light conversion particles, and then the excited state of the light conversion particles return to a stable state to emit the light having the specific color. However, when the light incident to the conversion filters CF has energy not enough to excite the light conversion particles, the incident light may be perceived by outside observers after passing through the color filters CF without being changed.

The color of the light emitted from the light conversion particles may be determined depending on a particle size of the light conversion particles. As the particle size increases, the wavelength of the light becomes longer, and as the particle size decreases, the wavelength of the light becomes shorter.

In an exemplary embodiment, the light conversion particles may be quantum dots. The light emitted from the light conversion particles of the color filter CF travels in various directions.

According to an exemplary embodiment, the conversion filters CF include a first conversion filter F1, a second conversion filter F2 and a third conversion filter F3. In such an embodiment, the first to third conversion filters F1 to F3 may be repeatedly arranged in the conversion filters CF. The black matrix BM is disposed between the first conversion filter F1, the second conversion filter F2 and the third conversion filter F3 to define a boundary therebetween, e.g., a boundary between the first conversion filter F1 and the second conversion filter F2, a boundary between the second conversion filter F2 and the third conversion filter F3 or a boundary between the third conversion filter F3 and the first conversion filter F1.

The first conversion filter F1 and the second conversion filter F2 may convert the light incident to the light conversion member CV to lights having different wavelength bandwidths from each other.

The first conversion filter F1 absorbs the first light to convert the first light to a second light. In one exemplary embodiment, for example, the second light has a wavelength bandwidth equal to or greater than about 640 nm and equal to or smaller than about 780 nm. In such an embodiment, the first conversion filter F1 may convert a blue light to a red light.

The second conversion filter F2 absorbs the first light to convert the first light to a third light. In one exemplary embodiment, for example, the third light has a third wavelength bandwidth equal to or greater than about 480 nm and equal to or smaller than about 560 nm. In such an embodiment, the second conversion filter F2 may convert the blue light to a green light.

The third conversion filter F3 may be a colorless filter or a gray filter. In a case that the light source LS generates the light having the blue color, the third conversion filter F3 transmits the light incident thereto without changing the color of the light generated by the light source LS. In such an embodiment, the third conversion filter F3 may include various materials as long as the third conversion filter F3 transmits at least a portion of the light incident thereto and should not be limited to a specific embodiment.

In such an embodiment, as described above, the wavelength of the light may be determined depending on the particle size of the quantum dot. According to an exemplary embodiment, the first conversion filter F1 includes a first quantum dot, the second conversion filter F2 includes a second quantum dot, and the third conversion filter F3 includes a third quantum dot. According to an exemplary embodiment, the first quantum dot may have a size greater than that of the second quantum dot, and the size of the second quantum dot may be greater than that of the third quantum dot. According to an alternative exemplary embodiment, the third conversion filter F3 may not include the quantum dot.

The black matrix BM is disposed adjacent to the color filter CF. The black matrix BM may include a light blocking material. The black matrix BM may have a shape corresponding to that of the peripheral area (not shown). The black matrix BM may effectively prevent a light leakage from occurring in an area except for the pixel area (not shown) through which the light travels and define the boundary between the pixel areas adjacent to each other.

Figure 4:
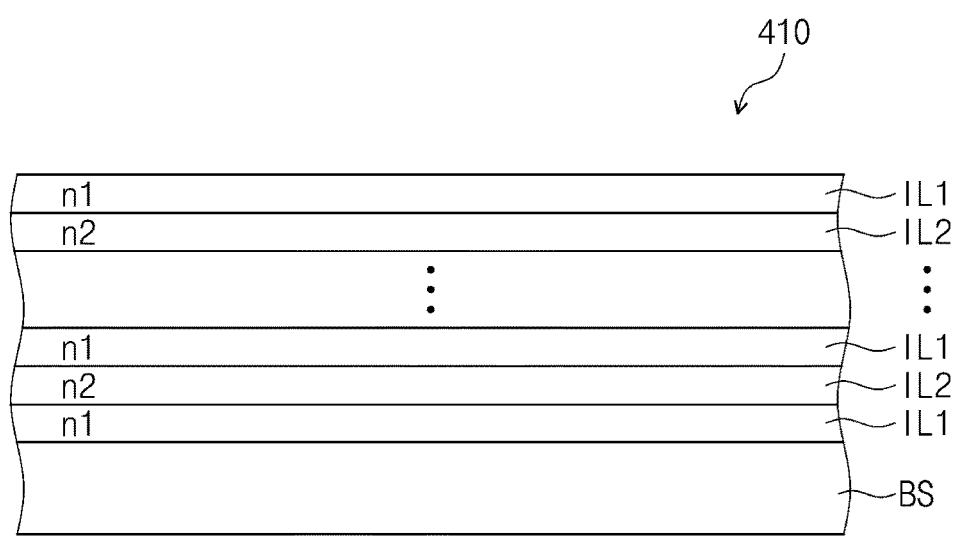
FIG. 4 is an enlarged cross-sectional view of a filter layer shown in FIG. 2.

FIG. 4 is an enlarged cross-sectional view of the filter layer 410 shown in FIG. 2.

Referring to FIG. 4, in an exemplary embodiment, the filter layer 410 of the optical filter 400 may be, but not limited to, a distributed Bragg reflector ("DBR"). In such an embodiment, the filter layer 410 may control a wavelength bandwidth of the light, which is to be transmitted, and a wavelength bandwidth of the light, which is to be reflected, on the basis of Bragg's law.

In an exemplary embodiment, the filter layer 410 may include a base substrate BS and a plurality of insulating layers disposed on the base substrate BS. The insulating layers include a first insulating layer IL1 and a second insulating layer IL2. In an exemplary embodiment, each of the first insulating layer IL1 and the second insulating layer IL2 is provided in a plural number, and the first insulating layers IL1 are alternately stacked with the second insulating layers IL2 on the base substrate BS.

In such an embodiment, the first and second insulating layers IL1 and IL2 have different refractive indices from each other. The first insulating layer IL1 has a first refractive index n1, and the second insulating layer IL2 has a second refractive index n2.

Each of the first and second insulating layers IL1 and IL2 has a thickness determined depending on the refractive index. In one exemplary embodiment, for example, when a center wavelength of the light incident to the filter layer 410 is denoted by "$\lambda$", the thickness of each of the first insulating layers IL1 is $\lambda/4n1$, and the thickness of each of the second insulating layers IL2 is $\lambda/4n2$.

In such an embodiment, the number of the first insulating layers IL1 and the number of the second insulating layers IL2 of the filter layer 410 may be determined depending on the thickness of each of the first and second insulating layers IL1 and IL2. In one exemplary embodiment, for example, a sum of the number of the first insulating layers IL1 and the number of the second insulating layers IL2 may be about one thousand.

Figure 5:
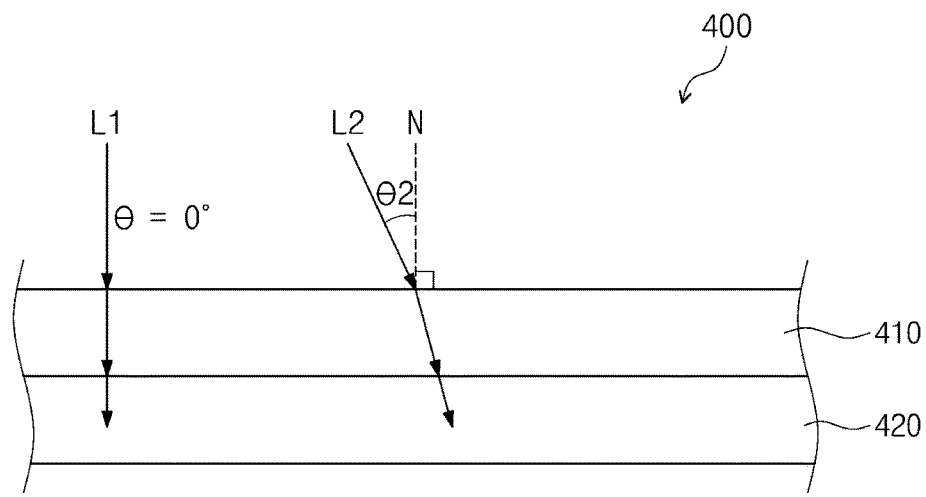
FIG. 5 is a view showing optical paths of first and second incident lights incident to an optical filter at first and second angles, respectively.
Figure 6:
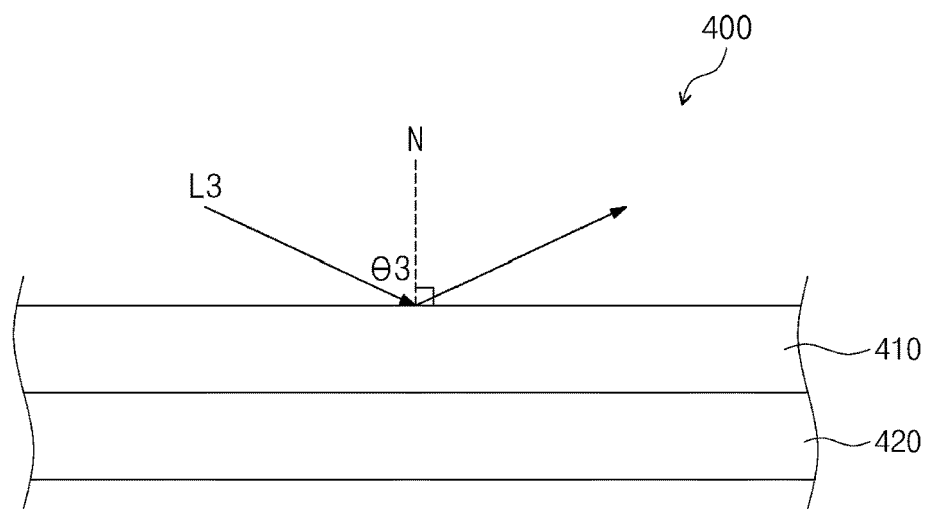
FIG. 6 is a view showing an optical path of a third incident light incident to the optical filter at a third angle.

FIG. 5 is a view showing optical paths of first and second incident lights incident to an optical filter at first and second angles, respectively, and FIG. 6 is a view showing an optical path of a third incident light incident to the optical filter at a third angle.

Figure 7:
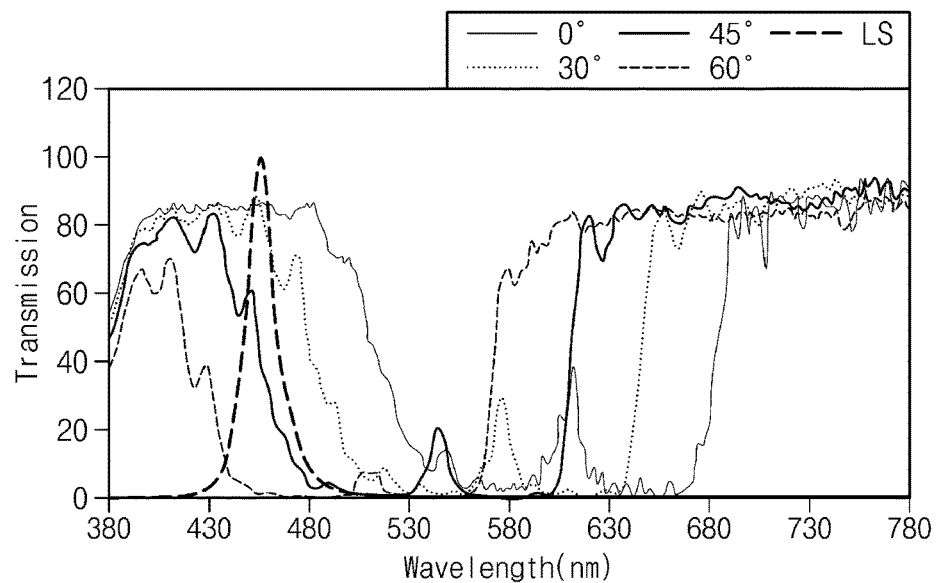
FIG. 7 is a graph showing transmission and reflection spectra of a filter layer as a function of an incident angle.
Figure 8:
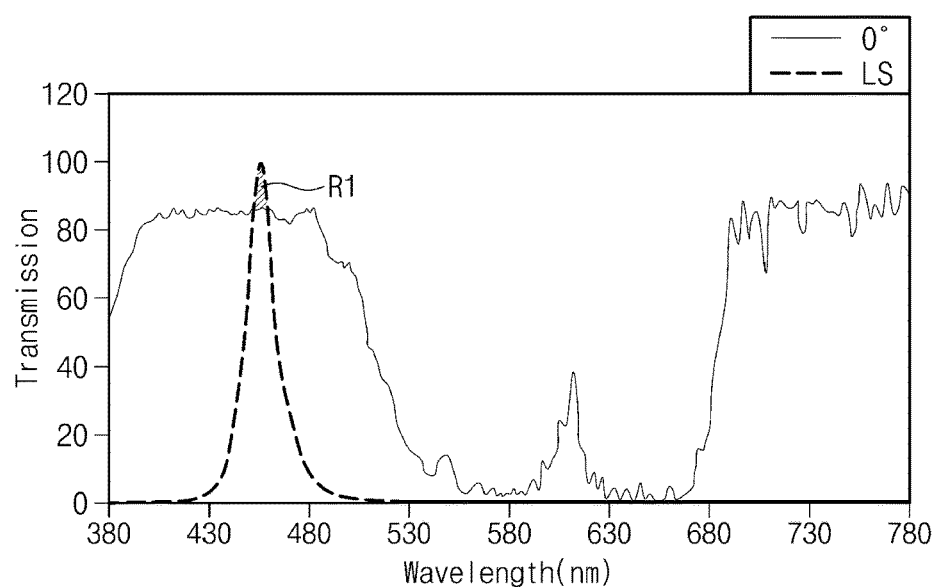
FIG. 8 is a graph showing transmission and reflection spectra of the filter layer with respect to the first incident light.
Figure 9:
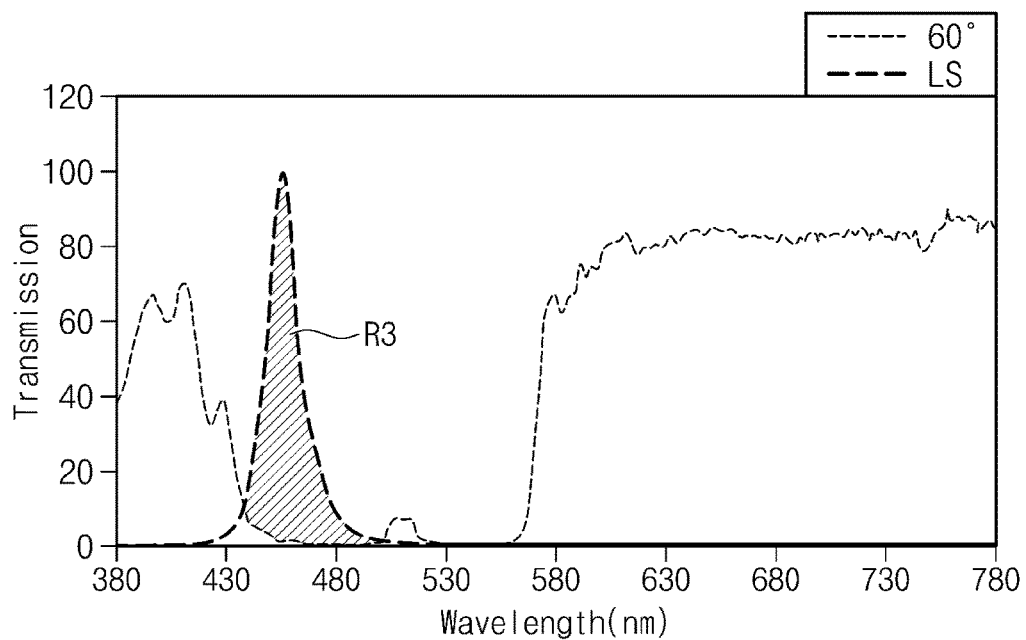
FIG. 9 is a graph showing transmission and reflection spectra of the filter layer with respect to the third incident light.

FIG. 7 is a graph showing transmission and reflection spectra of a filter layer as a function of an incident angle, FIG. 8 is a graph showing transmission and reflection spectra of the filter layer with respect to the first incident light, and FIG. 9 is a graph showing transmission and reflection spectra of the filter layer with respect to the third incident light.

Referring to FIG. 7, at least a portion of the light provided to the light guide plate 300 from the light source LS may be incident to the filter layer 410 disposed under the light guide plate 300. The filter layer 410 transmits a portion of the light incident thereto from the light guide plate 300 and reflects the remaining portion of the light except for the portion of the light incident thereto. In an exemplary embodiment, the filter layer 410 has a transmission wavelength bandwidth and a reflection wavelength bandwidth, which are determined based on an incident angle or a direction of the light incident thereto. The filter layer 410 transmits a light having a wavelength bandwidth in the transmission wavelength bandwidth thereof, and reflects a light having a wavelength bandwidth in the reflection wavelength bandwidth thereof. According to an exemplary embodiment, the transmission wavelength bandwidth and the reflection wavelength bandwidth of the filter layer 410 may be changed in accordance with the incident angle or the direction of the light incident to the filter layer 410.

As shown in FIGS. 7 to 9, the transmittance or reflectance of the filter layer 410 may be smaller than 100% in the whole visible light wavelength bandwidth. Accordingly, a portion of the light having the wavelength bandwidth in the transmission wavelength bandwidth of the filter layer 410 may be reflected, and a portion of the light having the wavelength bandwidth in the reflection wavelength bandwidth of the filter layer 410 may be transmitted. Accordingly, the light incident to the filter layer 410 may be substantially transmitted and reflected in the whole wavelength bandwidth. Hereinafter, for the convenience of description, the transmission wavelength bandwidth may correspond to a bandwidth having the transmittance of about 60% or more, and the reflection wavelength bandwidth may correspond to a bandwidth having the transmittance smaller than about 60%.

Referring to FIGS. 5 to 9, the light incident to the filter layer 410 from the light guide plate 300 is referred to as an "incident light", and an angle between the incident light and a normal line N of an upper surface of the filter layer 410 is referred to as an "incident angle $\theta$".

According to an exemplary embodiment, as the incident angle $\theta$ increases, the reflection wavelength bandwidth of the filter layer 410 may be reduced. In one exemplary embodiment, for example, where the first light provided from the light source is the blue light as shown in FIG. 7, an overlapping bandwidth width between the wavelength of the first light and the reflection wavelength bandwidth of the filter layer 410 may increase as the incident angle $\theta$ increases. In such an embodiment, as the incident angle $\theta$ increases, the reflectance of the filter layer 410 with respect to the first light may increase.

As shown in FIGS. 5 and 8, when the incident angle $\theta1$ of the first incident light L1 is about zero (0) degree, the reflection wavelength bandwidth of the filter layer 410 is equal to or greater than about 510 nm and equal to or smaller than about 690 nm. In an exemplary embodiment, the wavelength bandwidth of the first light is equal to or greater than about 400 nm and equal to or smaller than about 500 nm, the reflection wavelength bandwidth of the filter layer 410 does not overlap the wavelength bandwidth of the first light. In such an embodiment, when the first incident light L1 is incident to the filter layer 410 with the incident angle θ1 of about zero (0) degree, the filter layer 410 transmits the first incident light L1. Herein, a relative amount of the first incident light, which is reflected by the filter layer 410, is referred to as a "first reflection amount R1"

Referring to FIGS. 6 and 9, when the incident angle θ3 of the third incident light L3 is about 60 degrees, the reflection wavelength bandwidth of the filter layer 410 is equal to or greater than about 410 nm and equal to or smaller than about 580 nm. In an exemplary embodiment, where the wavelength bandwidth of the first light is equal to or greater than about 400 nm and equal to or smaller than about 500 nm, the reflection wavelength bandwidth of the filter layer 410 may overlap the wavelength bandwidth of the first light. Accordingly, when the third incident light L3 is incident to the filter layer 410 with the incident angle θ3 of about 60 degrees, the filter layer 410 reflects the third incident light L3.

When a relative amount of the third incident light L3 reflected by the filter layer 410 is referred to as a "third reflection amount R3", the third reflection amount R3 may be greater than the first reflection amount R1. In such an embodiment, as the incident angle of the incident lights L1, L2, and L3 incident to the filter layer 410 increases, the amount of the light reflected by the filter layer 410 may increase.

The light reflected by the filter layer 410 travels in the upper direction after passing through the light guide plate 300, and the light passing through the filter layer 410 is absorbed by the absorbing layer 420. In such an embodiment, as the incident angle of the incident lights L1, L2, and L3 incident to the filter layer 410 decreases, the amount of the light absorbed by the absorbing layer 420 may increase.

In a conventional display device, where the optical filter 400 is not provided under the light guide plate 300, lights traveling in a same direction as lights having small incident angle may be reflected and provided to the light condensing member 500 without being absorbed. The light is provided to the display module DM since the angle between the light and the normal line N increases by the inverse prisms, and the light transmits through the display apparatus 1000 without being absorbed by the second polarizing layer POL2 when the display apparatus 1000 is in the dark state. The transmitted light may cause a deterioration of the contrast ratio when the display apparatus 1000 is in the dark state. In an exemplary embodiment, the filter layer 410 transmits the light having the small incident angle θ among the light provided to the filter layer 410 from the light guide plate 300, and the absorbing layer 420 absorbs the transmitted light. Accordingly, in such an embodiment, the contrast ratio may be improved when the display apparatus 1000 is in the dark state.

Figure 10:
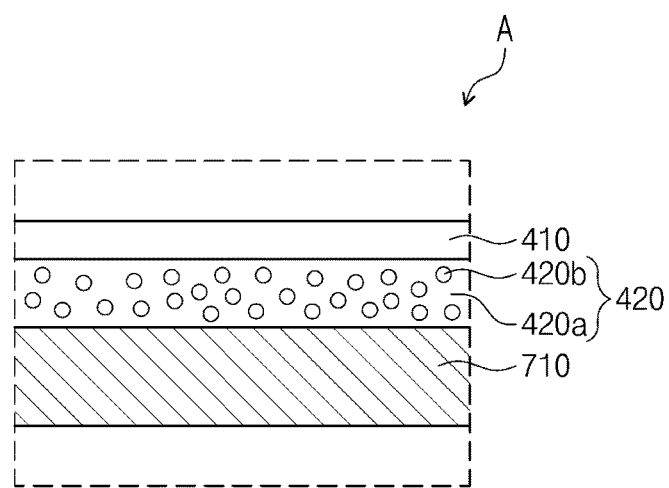
FIG. 10 is an enlarged cross-sectional view showing an optical filter according to an alternative exemplary embodiment of the disclosure.

FIG. 10 is an enlarged cross-sectional view showing an optical filter according to an alternative exemplary embodiment of the disclosure. The enlarged cross-sectional view shown in FIG. 10 corresponds to the encircled portion "A" shown in FIG. 2. In FIG. 10, the same reference numerals denote the same or like elements in the—exemplary embodiments described above, and any repetitive detailed descriptions thereof will be omitted.

Referring to FIG. 10, in an exemplary embodiment, an absorbing layer 420 of an optical filter 400 *t* may include a polymer layer 420*a* and a plurality of light absorbing particles 420*b*. The light absorbing particles 420*b* may be scattered or dispersed in the polymer layer 420*a*.

The polymer layer 420*a* includes a heat-curable polymer or a light-curable polymer, which has adhesiveness. In one exemplary embodiment, for example, the polymer layer 420*a* may include an optically clear adhesive ("OCA") or an optically clear resin ("OCR"). In such an embodiment, the absorbing layer 420 is disposed between the filter layer 410 and the accommodating member 700 to attach the filter layer 410 to the bottom portion 710 of the accommodating member 700.

According to another alternative exemplary embodiment, the polymer layer 420*a* may include at least one of polyethylene terephthalate ("PET"), polymethyl methacrylate ("PMMA"), and polycarbonate ("PC"). In such an embodiment, the polymer layer 420*a* may not include an adhesive material.

Figure 11:
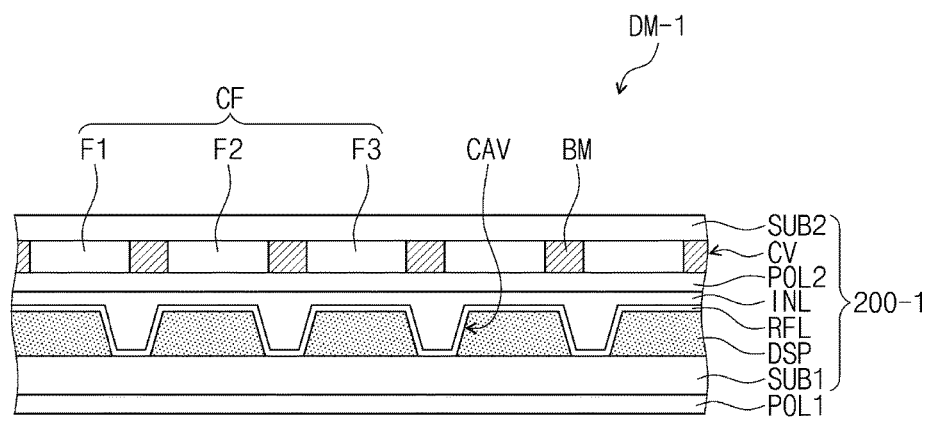
FIG. 11 is an enlarged cross-sectional view showing a display module according to an alternative exemplary embodiment of the disclosure.
Figure 12:
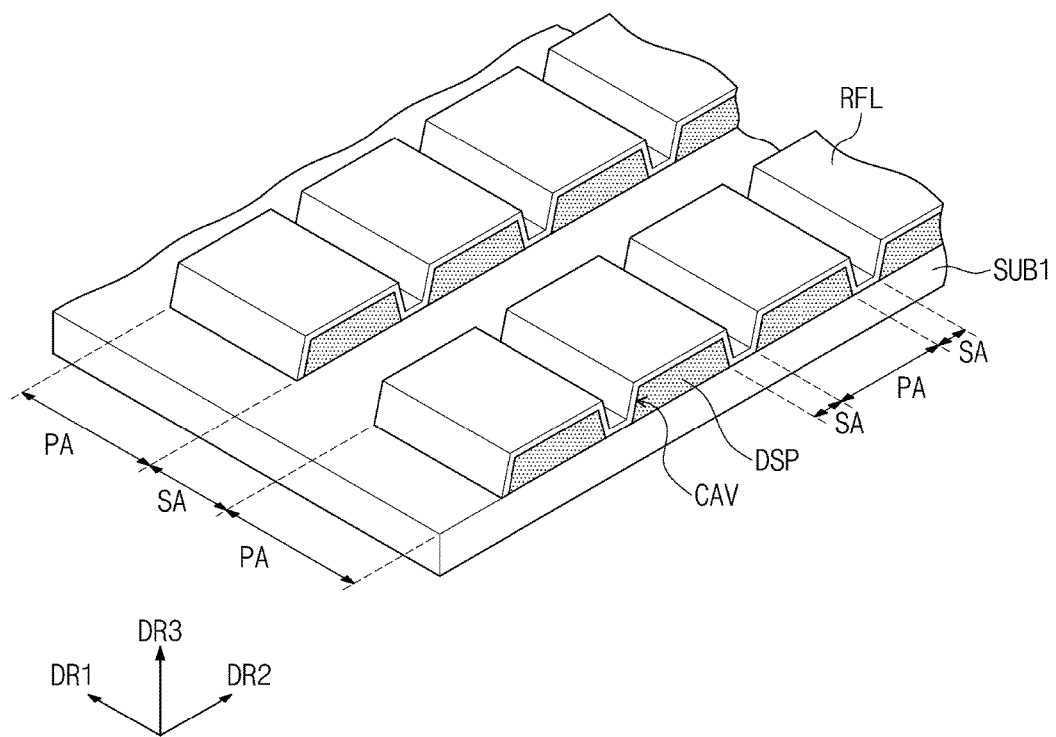
FIG. 12 is a perspective view showing a display device of the display module shown in FIG. 11.

FIG. 11 is an enlarged cross-sectional view showing a display module according to an alternative exemplary embodiment of the disclosure, and FIG. 12 is a perspective view of a display device of the display module shown in FIG. 11.

In FIGS. 11 and 12, the same reference numerals denote the same or like elements in the exemplary embodiments described above, and any repetitive detailed descriptions thereof will be omitted.

Referring to FIGS. 11 and 12, an exemplary embodiment of a display member 200-1 of a display module DM-1 includes a first substrate SUB1, a roof layer RFL, a plurality of display devices DSP, a light conversion layer CV, and a second substrate SUB2. FIGS. 11 and 12 merely show the display devices DSP arranged on the first substrate SUB1 for convenience of illustration. Additional components may further be arranged on the first substrate SUB1 in addition the components shown in FIGS. 11 and 12.

The first substrate SUB1 includes a pixel area PA and a peripheral area SA disposed adjacent to the pixel area PA when viewed in a plan view. In an exemplary embodiment, the pixel area PA is provided in a plural number, and the peripheral area SA is defined between the pixel areas PA.

The roof layer RFL is disposed on the first substrate SUB1. The roof layer RFL may be provided in a plural number, each of the roof layers RFL may extend in the second direction DR2 and the roof layers RFL may be arranged to be spaced apart from each other in the first direction DR1. In an exemplary embodiment, each of the roof layers RFL may have substantially the same as each other, and only one roof layer RFL will be described in detail for convenience of description.

The roof layer RFL has an integral shape extending in the second direction DR2. A portion of the roof layer RFL makes contact with the first substrate SUB1, and the other portion of the roof layer RFL is spaced apart from the first substrate SUB1.

The roof layer RFL includes a plurality of parts. The parts include a plurality of separation portions separated from the first substrate SUB1, respectively, and a plurality of contact portions making contact with the first substrate SUB1. The plurality of separation portions are overlapped with the pixel areas PA. The plurality of contact portions are overlapped with a part of the peripheral area SA.

Each of the separation portions is spaced apart from the first substrate SUB1 between one end portion of the separation portion and the other end portion of the separation portion in the first direction DR1. An upper surface of the first substrate SUB1, one separation portion, and two contact portions respectively connected to opposite ends of the separation portion define one cavity. Thus, the cavity has a tunnel shape extending in the first direction DR1.

The separation portions are alternately arranged with the contact portions in the second direction DR and respectively integrally formed with the contact portions. Accordingly, the roof layer RFL and the first substrate SUB1 may define a plurality of cavities CAV arranged in the second direction DR2. Ends of each of the cavities in the first direction DR1 are opened, and ends of each of the cavities in the second direction DR2 are blocked.

The display device DSP is disposed in the pixel area PA. In an exemplary embodiment, the display devices DSP may be respectively disposed in the cavities CAV.

The display device DSP may be implemented by various devices as long as the display device DSP displays the light controlled by electrical signals. In one exemplary embodiment, for example, the display device DSP may be a liquid crystal capacitor or an electrophoretic device. In an exemplary embodiment, where the display device DSP is the liquid crystal capacitor, a liquid crystal layer (not shown) may be disposed in the cavities CAV. In such an embodiment, the liquid crystal layer (not shown) includes liquid crystal molecules (not shown). An amount of the light passing through the cavities CAV among the light provided from the backlight unit BLU may be adjusted by controlling an electric field applied to the display member 200-1.

The display member 200-1 may further include an insulating layer INL. The insulating layer INL may be disposed on the roof layer RFL to cover the roof layer RFL. The insulating layer INL may seal the cavities CAV.

The insulating layer INL may include a transparent insulating material. In one exemplary embodiment, for example, the insulating layer INL may include an organic material and/or an inorganic material. The insulating layer INL may include a plurality of organic layers and a plurality of inorganic layer alternately stacked with the organic layers.

The insulating layer INL may be a sealing layer to seal the display device DSP from an external environment, and the insulating layer INL may be a planarization layer to provide a flat upper surface. However, the insulating layer INL should not be limited to those described herein, and may be variously modified.

The light conversion member CV is disposed on the insulating layer INL. The light conversion member CV may be directly formed on the insulating layer INL or may be provided on the insulating layer INL after being separately formed. In an exemplary embodiment, where the light conversion member CV is disposed on the insulating layer INL after being formed, a predetermined adhesive layer or an air layer may further be disposed between the light conversion member CV and the insulating layer INL.

Although some exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a light source which generates a first light which is a blue light;
   a display module which displays an image;
   a light guide plate disposed under the display module, wherein the light guide plate guides the first light from the light source; and
   an optical filter disposed under the light guide plate, wherein the optical filter comprises:
   a filter layer which transmits a portion of the first light incident thereto from the light guide plate, and reflects a portion of a remaining portion of the first light incident thereto from the light guide plate except for the portion; and
   an absorbing layer disposed under the filter layer and which absorbs the transmitted portion of the first light through the filter layer, wherein
   an angle between the first light incident to the filter layer from the light guide plate and a normal line of an upper surface of the filter layer is defined as an incident angle,
   an overlapping bandwidth between a reflection wavelength bandwidth of the filter layer and a wavelength bandwidth of the first light increases as the incident angle increases,
   an amount of light absorbed by the absorbing layer increases as the incident angle decreases, and
   the reflection wavelength bandwidth of the filter layer does not overlap the wavelength bandwidth of the first light when the incident angle is zero degree,
   wherein when the incident angle is zero degree, the reflection wavelength bandwidth of the filter layer is equal to or greater than 510 nm and equal to or smaller than 690 nm,
   when the incident angle is 60 degrees, the reflection wavelength bandwidth of the filter layer is equal to or greater than 410 nm and equal to or smaller than 580 nm.

2. The display apparatus of claim 1, further comprising:
   a light condensing member disposed between the display module and the light guide plate,
   wherein the light condensing member comprises a plurality of inverse prisms.

3. The display apparatus of claim 2, wherein the display module comprises:
   a first substrate;
   a plurality of pixels arranged on the first substrate;
   a second substrate disposed opposite to the first substrate;
   a light conversion layer arranged on the second substrate; and
   a liquid crystal layer disposed between the first substrate and the second substrate,
   wherein the light conversion layer converts the first light to a second light or a third light, and
   each of the second light and the third light has a wavelength bandwidth different from the wavelength bandwidth of the first light.

4. The display apparatus of claim 3, wherein the light conversion layer comprises:
   a first conversion filter which converts the first light to the second light;
   a second conversion filter which converts the first light to the third light; and
   a light blocking layer disposed between the first conversion filter and the second conversion filter when viewed in a plan view.

5. The display apparatus of claim 4, wherein
   the first conversion filter comprises a plurality of first quantum dots,
   the second conversion filter comprises a plurality of second quantum dots, and
   each of the first quantum dots has a size different from a size of each of the second quantum dots.

6. The display apparatus of claim 3, wherein the display module further comprises:
   a first polarizing layer disposed under the second substrate; and
   a second polarizing layer disposed between the liquid crystal layer and the light conversion layer.

7. The display apparatus of claim 3, wherein the reflection wavelength bandwidth of the filter layer includes the wavelength bandwidth of the second light when the incident angle is zero degree.

8. The display apparatus of claim 3, wherein the filter layer comprises:
a plurality of first insulating layers, each having a first refractive index; and
a plurality of second insulating layers, each having a second refractive index different from the first refractive index,
wherein the first insulating layers are alternately stacked with the second insulating layers.

9. The display apparatus of claim 1, wherein the absorbing layer has a black color.

10. The display apparatus of claim 1, wherein a color of the absorbing layer is a complementary color to a color of the first light.

11. A display apparatus comprising:
a light source which generates a first light;
a display module which displays an image;
a light guide plate disposed under the display module and which receives the first light from the light source; and
an optical filter disposed to face the display module such that the light guide plate is disposed between the optical filter and the display module,
wherein the optical filter comprises:
a filter layer disposed under the light guide plate and which selectively transmits or reflects the first light from the light guide plate; and
an absorbing layer disposed under the filter layer and which absorbs a transmitted first light, which is transmitted through the filter layer and incident thereto,
wherein an angle between the transmitted first light and a normal line of an upper surface of the filter layer is defined as an incident angle,
a reflectance of the filter layer with respect to the transmitted first light increases as the incident angle increases,
an amount of light absorbed by the absorbing layer increases as the incident angle decreases, and
a reflection wavelength bandwidth of the filter layer does not overlap a wavelength bandwidth of the first light when the incident angle is zero degree,
wherein when the incident angle is zero degree, the reflection wavelength bandwidth of the filter layer is equal to or greater than 510 nm and equal to or smaller than 690 nm,
when the incident angle is 60 degrees, the reflection wavelength bandwidth of the filter layer is equal to or greater than 410 nm and equal to or smaller than 580 nm.

12. The display apparatus of claim 11, further comprising a light condensing member disposed between the display module and the light guide plate and comprising a plurality of inverse prisms.

13. The display apparatus of claim 12, wherein the display module comprises:
a first polarizing layer disposed at a lowermost position of the display module and having an absorbing axis;
a second polarizing layer disposed on the first polarizing layer and having a transmitting axis;
a liquid crystal layer disposed between the first polarizing layer and the second polarizing layer; and
a light conversion layer disposed on the second polarizing layer, wherein the light conversion layer comprises a plurality of quantum dots.

14. The display apparatus of claim 11, wherein the filter layer has a multi-layer structure in which a plurality of insulating layers having different refractive indices from each other are alternately stacked one on another.

15. A display apparatus comprising:
a display module comprising a light conversion layer disposed therein, wherein the light conversion layer comprises a plurality of quantum dots; and
a backlight unit disposed under the display module, wherein the backlight unit provides a light to the display module,
wherein the backlight unit comprises:
a light source which generates the light;
a light guide plate which guides the light from the light source to the display module;
a light condensing member disposed between the light guide plate and the display module, wherein the light condensing member comprises a plurality of inverse prisms; and
an optical filter disposed under the light guide plate,
wherein the optical filter comprises:
a filter layer disposed under the light condensing member and which selectively transmits or reflects the light incident thereto from the light guide plate; and
an absorbing layer disposed under the filter layer and which absorbs the light transmitted thereto through the filter layer,
wherein an angle between the light incident to the filter layer from the light guide plate and a normal line of an upper surface of the filter layer is defined as an incident angle,
a reflection wavelength of the filter layer decreases as the incident angle increases,
an amount of light absorbed by the absorbing layer increases as the incident angle decrease, and
a reflection wavelength bandwidth of the filter layer does not overlap a wavelength bandwidth of the first light when the incident angle is zero degree,
wherein when the incident angle is zero degree, the reflection wavelength bandwidth of the filter layer is equal to or greater than 510 nm and equal to or smaller than 690 nm,
when the incident angle is 60 degrees, the reflection wavelength bandwidth of the filter layer is equal to or greater than 410 nm and equal to or smaller than 580 nm.

16. The display apparatus of claim 15, wherein the absorbing layer comprises:
a polymer layer; and
a plurality of light absorbing particles dispersed in the polymer layer,
wherein the light absorbing particles absorb the light transmitted thereto through the filter layer.

17. The display apparatus of claim 16, wherein the polymer layer comprises an adhesive material.

* * * * *